(12) United States Patent
Almog et al.

(10) Patent No.: US 8,438,545 B1
(45) Date of Patent: May 7, 2013

(54) SYSTEM, METHOD AND COMPUTER PROGRAM PRODUCT FOR VALIDATING RESULTS OF A TEST UTILIZING A TEST-INDEPENDENT VALIDATION ENTITY

(75) Inventors: Dan Almog, D.N. Negev (IL); Yossi Avni, Shoam (IL)

(73) Assignee: Amdocs Software Systems Limited, Dublin (IE)

( * ) Notice: Subject to any disclaimer, the term of this patent is extended or adjusted under 35 U.S.C. 154(b) by 1477 days.

(21) Appl. No.: 11/610,387

(22) Filed: Dec. 13, 2006

Related U.S. Application Data

(60) Provisional application No. 60/843,989, filed on Sep. 11, 2006.

(51) Int. Cl.
*G06F 9/44* (2006.01)
(52) U.S. Cl.
USPC .......................................................... 717/126

(58) Field of Classification Search .......... 717/127–130, 717/126; 709/203, 224; 714/25, 37, 38.14; 725/32; 707/102
See application file for complete search history.

(56) References Cited

U.S. PATENT DOCUMENTS

| | | | |
|---|---|---|---|
| 5,481,717 A | 1/1996 | Gaboury | 395/700 |
| 7,421,621 B1 * | 9/2008 | Zambrana | 714/38.14 |
| 2004/0044729 A1 * | 3/2004 | Foerg et al. | 709/203 |
| 2004/0103396 A1 * | 5/2004 | Nehab | 717/127 |
| 2005/0060610 A1 * | 3/2005 | Leary et al. | 714/25 |
| 2005/0246722 A1 | 11/2005 | Shier et al. | 719/321 |
| 2006/0015613 A1 * | 1/2006 | Greaves et al. | 709/224 |
| 2006/0026463 A1 * | 2/2006 | Paliwal et al. | 714/37 |
| 2006/0195865 A1 * | 8/2006 | Fablet | 725/32 |
| 2007/0234308 A1 * | 10/2007 | Feigenbaum et al. | 717/130 |
| 2008/0059505 A1 * | 3/2008 | Kalia et al. | 707/102 |

* cited by examiner

*Primary Examiner* — Tuan A Vu
(74) *Attorney, Agent, or Firm* — Zilka-Kotab, PC

(57) ABSTRACT

A test validation system, method and computer program product are provided. In use, at least one test-independent validation entity is identified. In addition, results of a test of computer code are validated, utilizing the at least one test-independent validation entity.

26 Claims, 8 Drawing Sheets

SYSTEM, METHOD AND COMPUTER PROGRAM PRODUCT FOR VALIDATING RESULTS OF A TEST UTILIZING A TEST-INDEPENDENT VALIDATION ENTITY

RELATED APPLICATION(S)

The present application claims priority to a provisional application filed on Sep. 11, 2006 under application Ser. No. 60/843,989, which is incorporated herein by reference in its entirety.

FIELD OF THE INVENTION

The present invention relates to software validation, and more particularly to validating results of a test of computer code.

BACKGROUND

Testing is widely utilized for verifying the operability of computer code (e.g. applications, etc.). For example, in some instances, testing is used for determining whether computer code is running correctly, such that errors and/or undesired effects within such computer code may be identified. However, validation of the results of such testing is often desired.

Generally, a significant amount of time is spent for validating test results, due to the complexity of such test results (e.g. difficulty in identifying the test results, etc.). In addition, such validation is traditionally integrated within the test itself. With the increasing complexity of computer code that is tested, validating testing results associated therewith also becomes more complex. Thus, validation techniques that are specifically tailored to associated tests are often required. Unfortunately, this has the potential of being expensive and/or difficult to perform.

There is thus a need for overcoming these and/or other problems associated with the prior art.

SUMMARY

A test validation system, method and computer program product are provided. In use, at least one test-independent validation entity is identified. In addition, results of a test of computer code are validated, utilizing the at least one test-independent validation entity.

DETAILED DESCRIPTION

Figure 1:
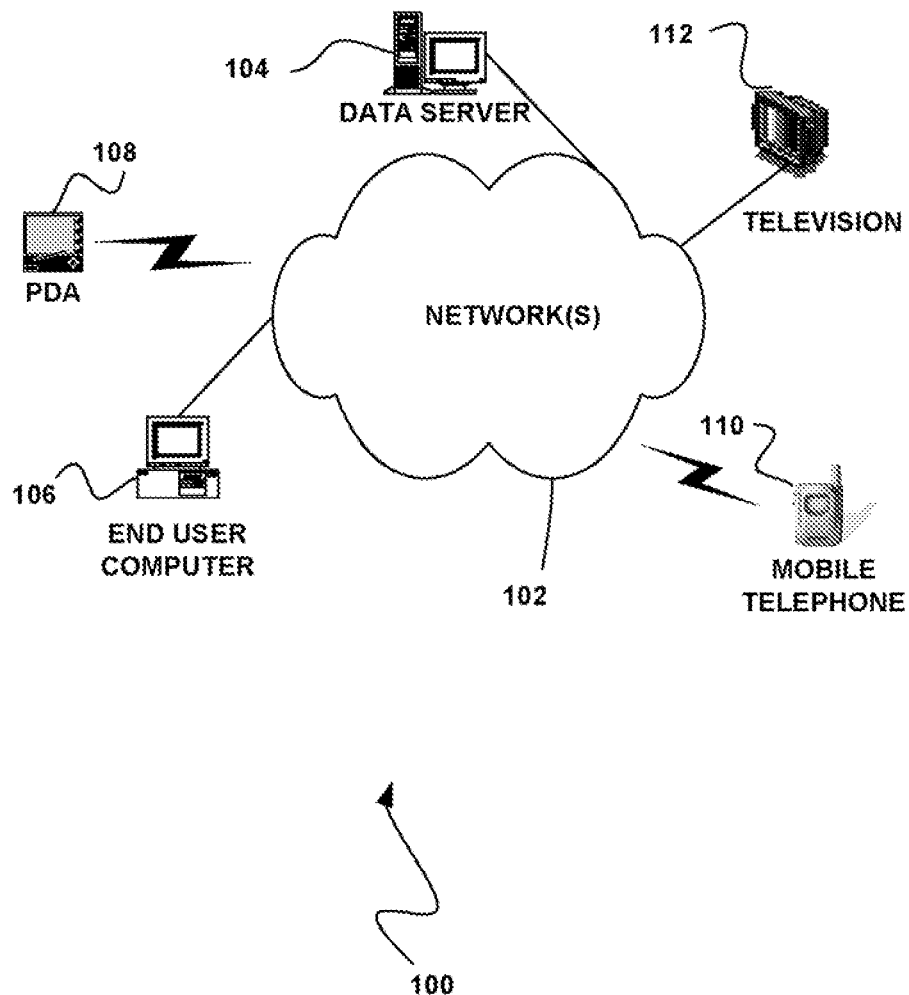
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
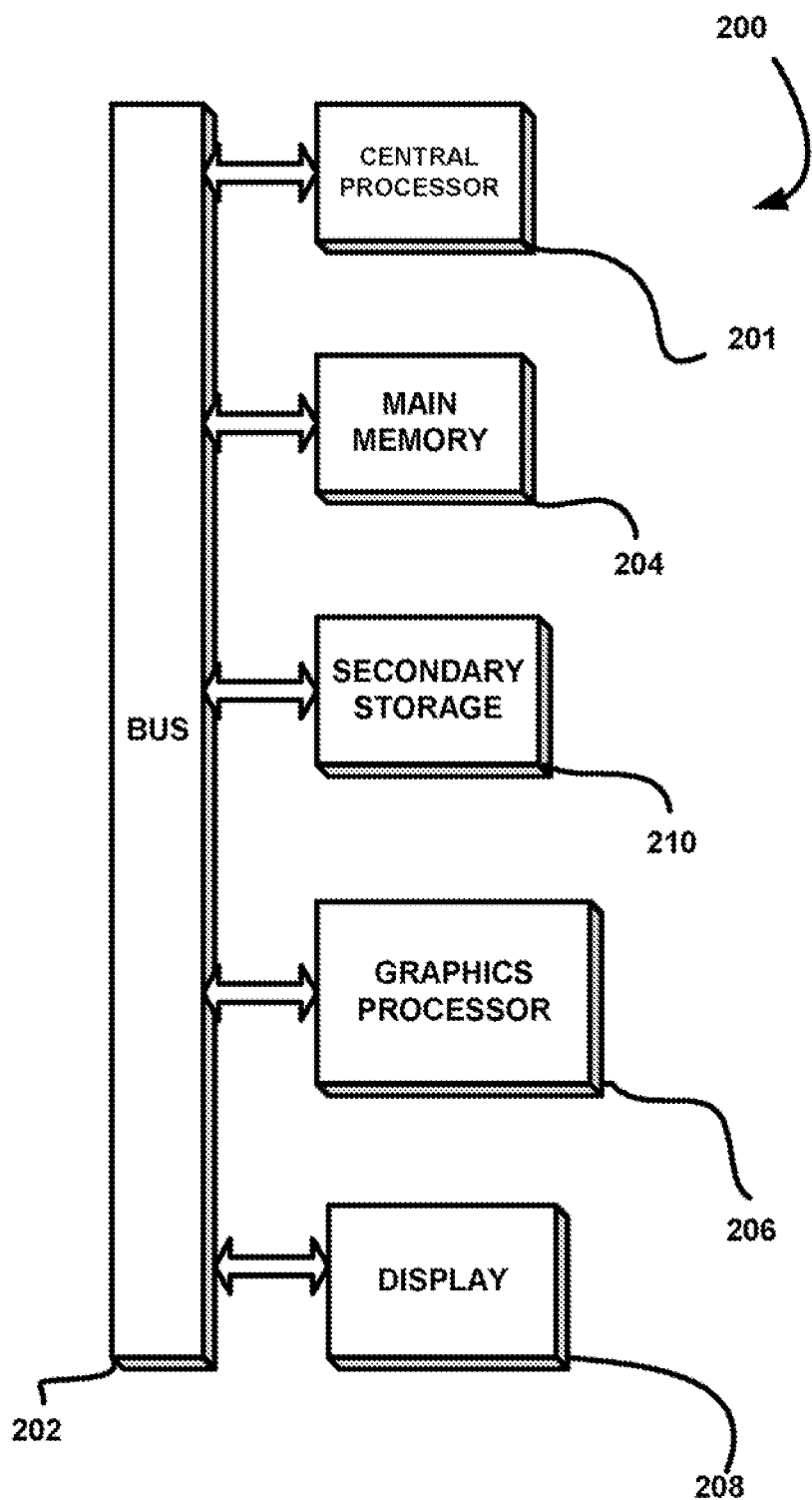
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
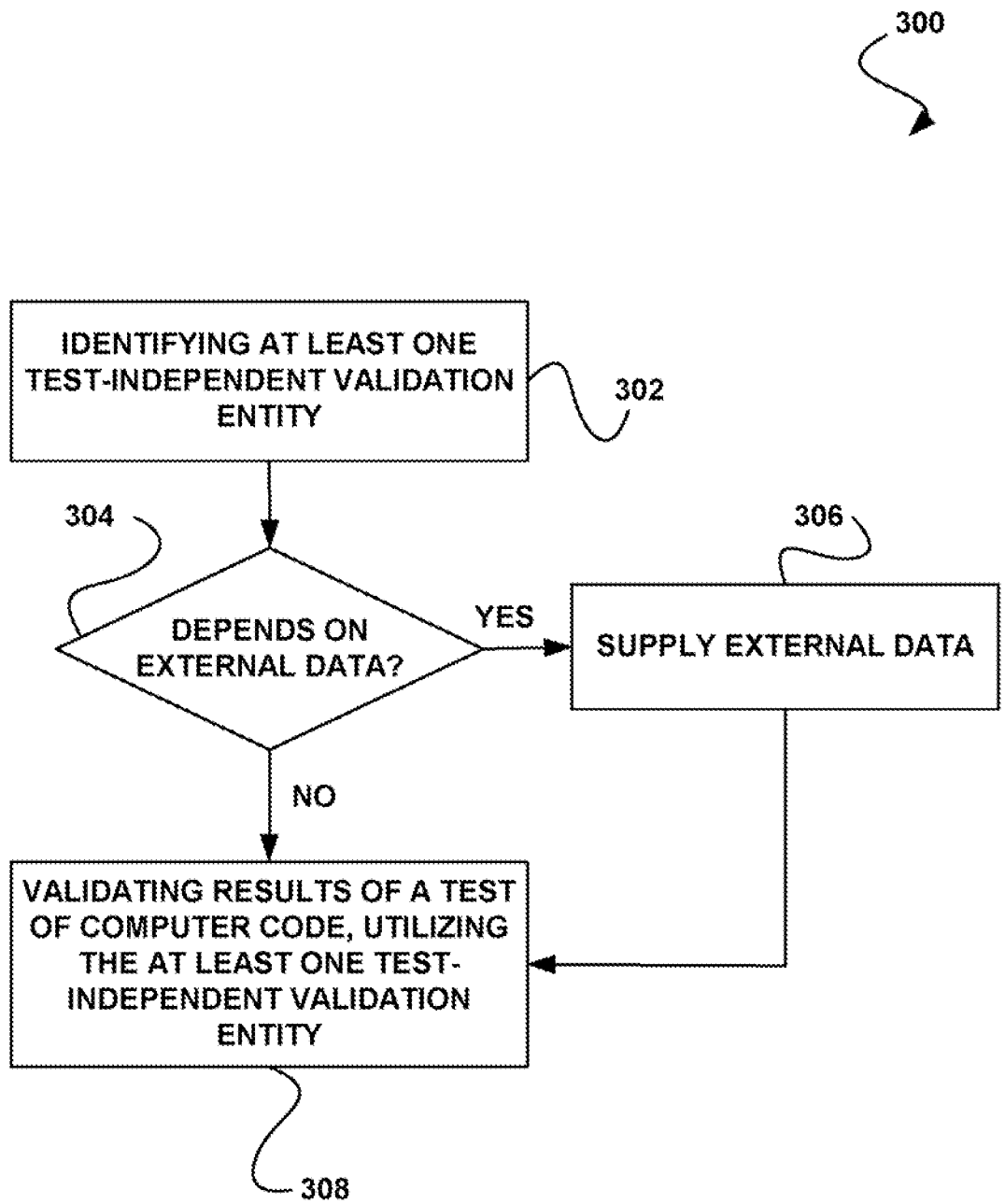
FIG. 3 shows a method for validating results of a test utilizing a test-independent validation entity, in accordance with one embodiment.

FIG. 3 shows a method 300 for validating results of a test utilizing a test-independent validation entity, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, at least one test-independent validation entity is identified. The test-independent validation entity may include any entity capable validating results of a test of computer code. For example, the test-independent validation entity may include computer code that may be utilized for validating such results.

In one embodiment, the test-independent validation entity may be associated with the computer code being tested. As another option, the test-independent validation entity may be generic, such that it may be utilized for validating results of a plurality of different tests of computer code. One example of the structure of the test-independent validation entity, in accordance with a different embodiment, will be described during reference to FIG. 5.

Moreover, the test-independent validation entity may be identified in any desired manner. In one embodiment, the test-independent validation entity may be identified based on a selection thereof made by a user. In another embodiment, the test-independent validation entity may be identified automatically based on an associated test for which results are to be validated. For example, each test may be associated with at least one test-independent validation entity.

Further, the test-independent validation entity may be identified from a plurality of predefined test-independent validation entities. In some embodiments, each of such predefined test-independent validation entities may be user-generated, for example. As another option, each test-independent validation entity may be user configured.

Additionally, it is determined whether the test-independent validation entity depends on external data, as shown in decision 304. The external data include any data not included in the test-independent validation entity. For example, the external data may include dynamic data.

If it is determined that the test-independent validation entity depends on external data, then the external data may be supplied to the test-independent validation entity, as shown in operation 306. For example, the external data may be supplied by a source of the external data based on a request from the test-independent validation entity. It should be noted that decision 304 and operation 306 are illustrated as optional embodiments only, and that the method 300 of the present description may not necessarily be limited by such.

Still yet, results of a test of computer code are validated, utilizing the test-independent validation entity, as shown in operation 308. The test may involve any data (e.g. test computer code/data, etc.) capable of generating results with respect to computer code. Just by way of example, the test may include executable test computer code that generates results of computer code being tested. In other various embodiments, the test may involve converting data, reconciling data, etc.

Still yet, the computer code which is tested may include a software application, a software package, and/or any other type of computer code capable of being tested. In one embodiment, the test may include executing each portion of the computer code. In another embodiment, the test may include simulating usage of the computer code. Of course, however, the test may include any type of test capable of generating results with respect to the computer code.

Furthermore, in one possible embodiment, the results of the test may include data stored during the test of the computer code. Thus, the results may optionally be stored in a database, a file system, etc. In one example, such data may include output of the computer code (e.g. errors, values, etc.). In another embodiment, the results may include a flow of the computer code during the test, or any results, for that matter.

Also, the results of the test may be in any desired format. For example, the results of the test may be written in an extended markup language (XML). As another example, the results of the test may be compressed. In yet another example, the results of the test may be encrypted. In this way, the test-independent validation entity may be capable of validating results of any desired format, and therefore from various types of data sources.

Additionally, the results of the test may be validated in any desired manner, utilizing the test-independent validation entity. In one embodiment, the validation performed by the test-independent validation entity may include verifying results of the test of computer code. In another embodiment, the results of the test may validated by comparing such results to at least a portion of the test-independent validation entity. One example of such comparison, in accordance with another embodiment, will be described in more detail with respect to FIG. 4.

In addition, the test-independent validation entity may be independent from the test for which results are verified. In one embodiment, the test-independent validation entity may be utilized independently from the test of the computer code. Thus, in one embodiment, integration of the test-independent validation entity and the test may optionally be avoided.

In another embodiment, the test-independent validation entity may be stored independently (e.g. separately, etc.) from the test. For example, the test-independent validation entity may be stored on a server computer in communication with a client computer on which such test is located (e.g. executed, stored, etc.). In this way, the test-independent validation entity may optionally be utilized by a plurality of client computers. The server computer and/or client computer may include, for example, any of the devices described above with respect to FIG. 1.

Accordingly, a test-independent validation entity may be utilized for validating results of a test, such that the validation of such results may be performed independent of the test. Thus, in various optional embodiments, the validation may be accomplished without necessarily being integrated within such test, stored with the test, maintained as part of the test, etc. As a result, the test-independent validation entity may be utilized to validate results of a plurality of different tests, of a plurality of instances of a test, etc.

More illustrative information will now be set forth regarding various optional architectures and features of different embodiments with which the foregoing framework of FIG. 3 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
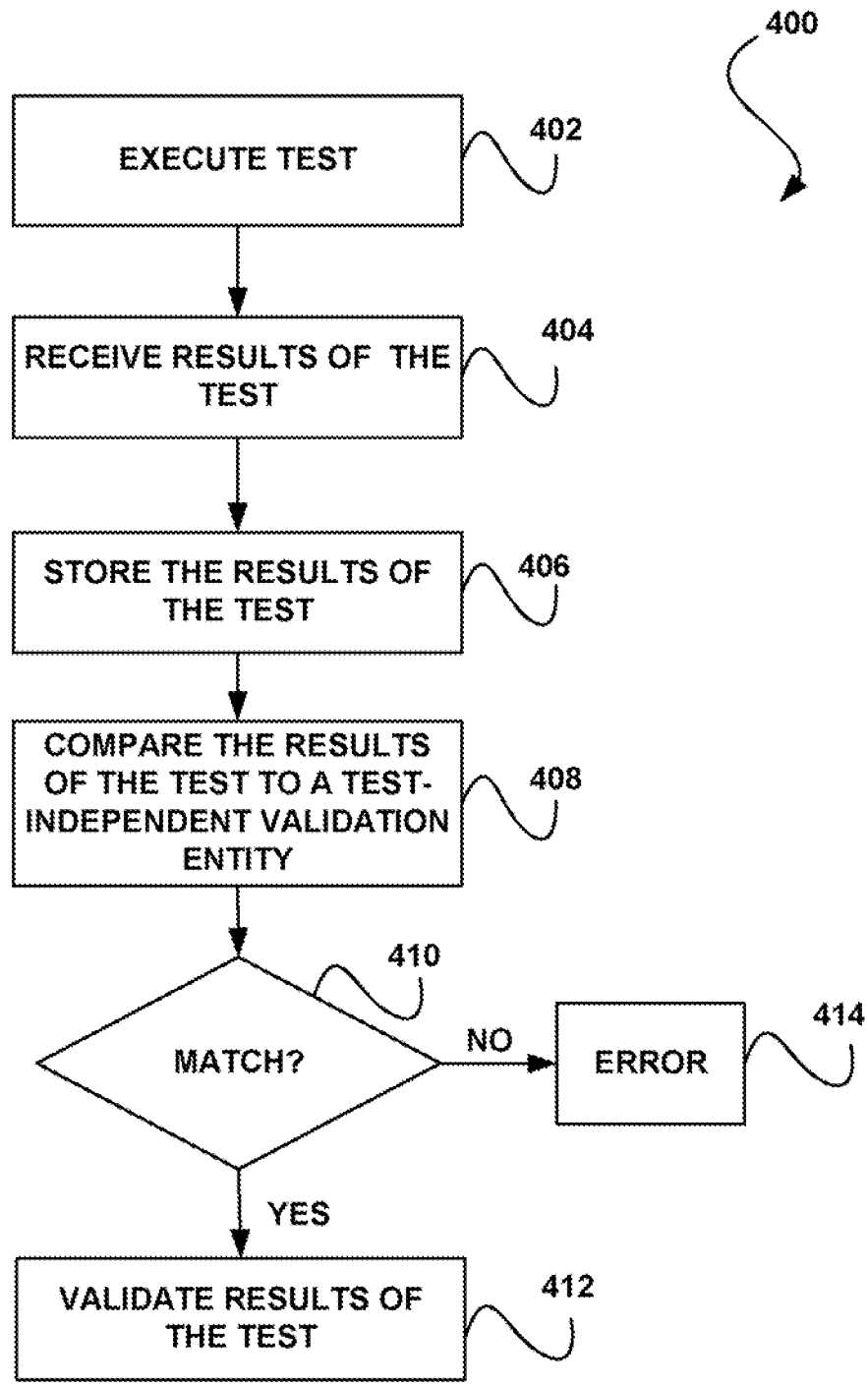
FIG. 4 shows a method for validating results of a test utilizing a test-independent validation entity, in accordance with another embodiment.

FIG. 4 shows a method 400 far validating results of a test utilizing a test-independent validation entity, in accordance with another embodiment. As an option, the method 400 may be implemented in the context of the details of FIGS. 1-3. Of course, however, the method 400 may be carried out in any desired environment. Again, the aforementioned definitions may equally apply to the description below.

As shown in operation 402, a test is executed. The test may be executed on computer code (e.g. a software application, etc.) for testing such computer code. In addition, the test may optionally be executed on a computer on which the computer code is located. Further, the test may be executed for generating results thereof.

Results of the test are then received, as shown in operation 404. The results of the test may be received at a computer that is separate from the computer on which the test is executed, for example. The results of the test may also be received in any desired format (e.g. a format associated with the computer code tested, etc.).

Still yet, the results of the test are stored, as shown in operation 406. The results of the test may be stored in a database and/or any other data structure capable of storing data. Moreover, the results of the test may be stored on the computer on which they are received, as described above. Optionally, if the results of the test are encrypted, then such results may be decrypted prior to being stored. In another embodiment, if the results of the test are compressed, then such results may be decompressed prior to being stored.

As shown in operation 408, the results of the test are compared to a test-independent validation entity. In one optional embodiment, the comparison may include an inter-source comparison of the results and the test-independent validation entity. Of course, it should be noted that the results of the test may also be compared to only a portion of the test-independent validation entity.

It is then determined whether the results and the test-independent validation entity match, as shown in decision 410. Optionally, it may be determined whether there is a match for each portion of the results (e.g. each piece of data, etc.). In this way, the results may be validated as a whole and/or according to each portion thereof.

If a match is found, the results of the test (or portion thereof) are validated. Note operation 412. If, however, a match is not found, an error may be generated, as shown in operation 414. The error may include an error message, for example. Further, the error message may include information associated with the unmatched results of the test and the test-independent validation entity.

Figure 5:
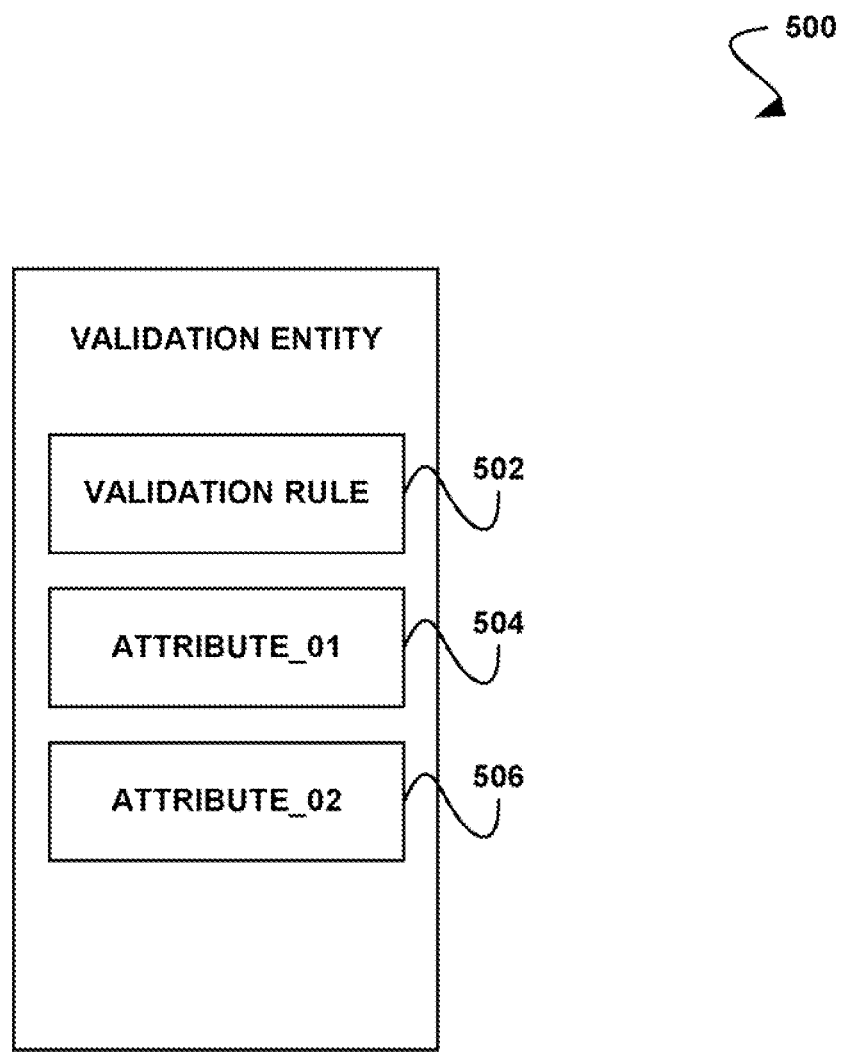
FIG. 5 shows a test-independent validation entity, in accordance with yet another embodiment.

FIG. 5 shows a test-independent validation entity 500, in accordance with yet another embodiment. As an option, the test-independent validation entity 500 may be implemented in the context of the details of FIGS. 1-4. Of course, however, the test-independent validation entity 500 may be implemented in any desired environment. Again, the aforementioned definitions may equally apply to the description below.

As shown, the test-independent validation entity 500 may include a validation rule 502. Of course, the test-independent validation entity 500 may also include a plurality of validation rules. The validation rule may be associated with a single validation of at least a portion of results of a test.

The test-independent validation entity 500 may also include attributes (attribute_01 504 and attribute_02 506). As shown, the test-independent validation entity 500 may include a plurality of attributes 504 and 506, but, of course, it should be noted that the test-independent validation entity 500 may also include a single attribute. In one embodiment, the attributes 504 and 506 may each include an abstract representation of a piece of data (e.g. data element, etc.) capable of being located in results of a test.

In another embodiment, the attributes 504 and 506 may include information for retrieving the results of a test (e.g. a SQL query, an xPath, X:Y coordinates, file path, etc.). In yet another embodiment, the attributes 504 and 506 may be dynamic. For example, the attributes 504 and 506 may be populated with data (e.g. definite location path of certain data element or any other dynamic property) during execution of an associated test.

Further, the attributes 504 and 506 may be utilized by the validation rule 502. For example, the validation rule 502 may apply at least one operator to such attributes 504 and 506. The operator(s) may include, for example, Boolean operators (e.g. AND, OR, NOT, NOR, etc), mathematical operators (e.g. addition, subtraction, etc.), relational operators (less than, greater than, etc.), and/or any other operators capable of performing operations on the attributes 504 and 506.

Table 1 illustrates an example of data within a test-independent validation entity. It should be noted that such data within the test-independent validation entity is presented just by way of example only, and therefore should not be construed as limiting in any manner. Of course, other more complex test-independent validation entities are contemplated, as well as test-independent validation entities capable of being used during runtime.

TABLE I

```
// for checking whether the numbers of rows
// in a specific table is greater than zero
Table name: OLC1_SESSION
Attribute name: num_of_rows_att
Content: SELECT COUNT(*)
   FROM OLC1_SESSION
Rule name: isSessionTableEmpty
Content: eq(num_of_rows_att, 0)
```

Figure 6:
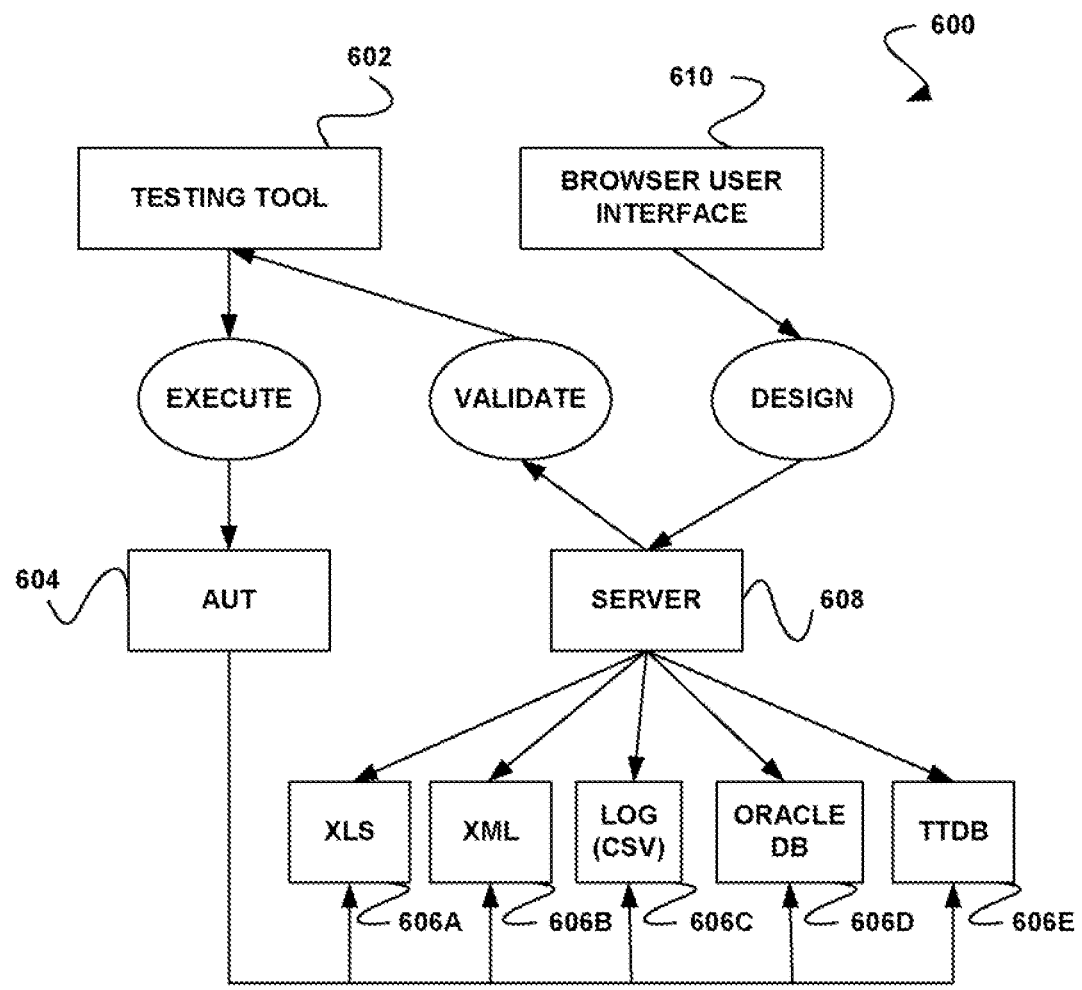
FIG. 6 shows a system for validating results of a test utilizing a test-independent validation entity, in accordance with yet another embodiment.

FIGS. 6 show a system 600 for validating results of a test utilizing a test-independent validation entity, in accordance with yet another embodiment. As an option, the system 600 may be implemented in the context of the details of FIGS. 1-5. Of course, however, the system 600 may be used in any desired environment. Again, the aforementioned definitions may equally apply to the description below.

As shown, a testing tool 602 may be utilized for testing computer code. In one embodiment, the testing tool 602 may include a test. For example, the testing tool 602 may include the Mercury™ WinRunner®, the Mercury QuickTestProfessional™, etc. In another embodiment, a user may utilize the testing tool 602 for executing the test. In addition, the testing tool 602 may be capable of supplying external data required for executing the test. In one optional embodiment, the testing tool 602 may request and/or receive such external data from a source external to the testing tool 602. In another optional embodiment, the testing tool 602 may supply the external data to the test during the execution of the test.

Based on the execution of the testing tool 602, an application under test (AUT) module 604 is utilized for running the test and generating testing results 606A-E. The testing results 606A-E may optionally be in any number of various formats. As specifically shown, the results 606A-E may include a Microsoft Excel® (XLS) format, an XML format, a LOG file/Comma Separated Value (CSV) format, an Oracle database format, and a Tooltalk (TT) database format, but, of course, may also include any other format capable of being associated with results of a test.

The results 606A-E are then transmitted to a server 608. In one embodiment, the results 606A-E may be transmitted via network. Such network may include any of the networks described above with respect to FIG. 1, for example.

The server 608 may include a database for storing the received results 606A-E. The server 608 may also include at least one test-independent validation entity. Thus, the server may utilize the test-independent validation entity for validating the received results, as shown.

The validated results and/or any results not validated are then transmitted to the testing tool 602. For example, the server 608 may generate a report associated with such validation. In this way, test-independent validation entities may be utilized independently of a testing tool 602, and may be provided in a central location, for example, such that the testing tool 602 may efficiently utilize such test-independent validation entities. Further, such validation may be provided automatically via the server 608, thus eliminating the need to manually validate the testing results.

As another option, a browser user interface 610 may be provided. Such browser user interface 610 may be provided to a plurality of computers, for example. In addition, the browser user interface 610 may allow users to design, generate and/or configure test-independent validation entities.

Thus, the browser user interface 610 may be utilized for managing test-independent validation entities. As shown, the browser user interface 610 may be in communication with the server 608. In this way, users may customize test-independent validation entities utilized for validating test results.

Figure 7:
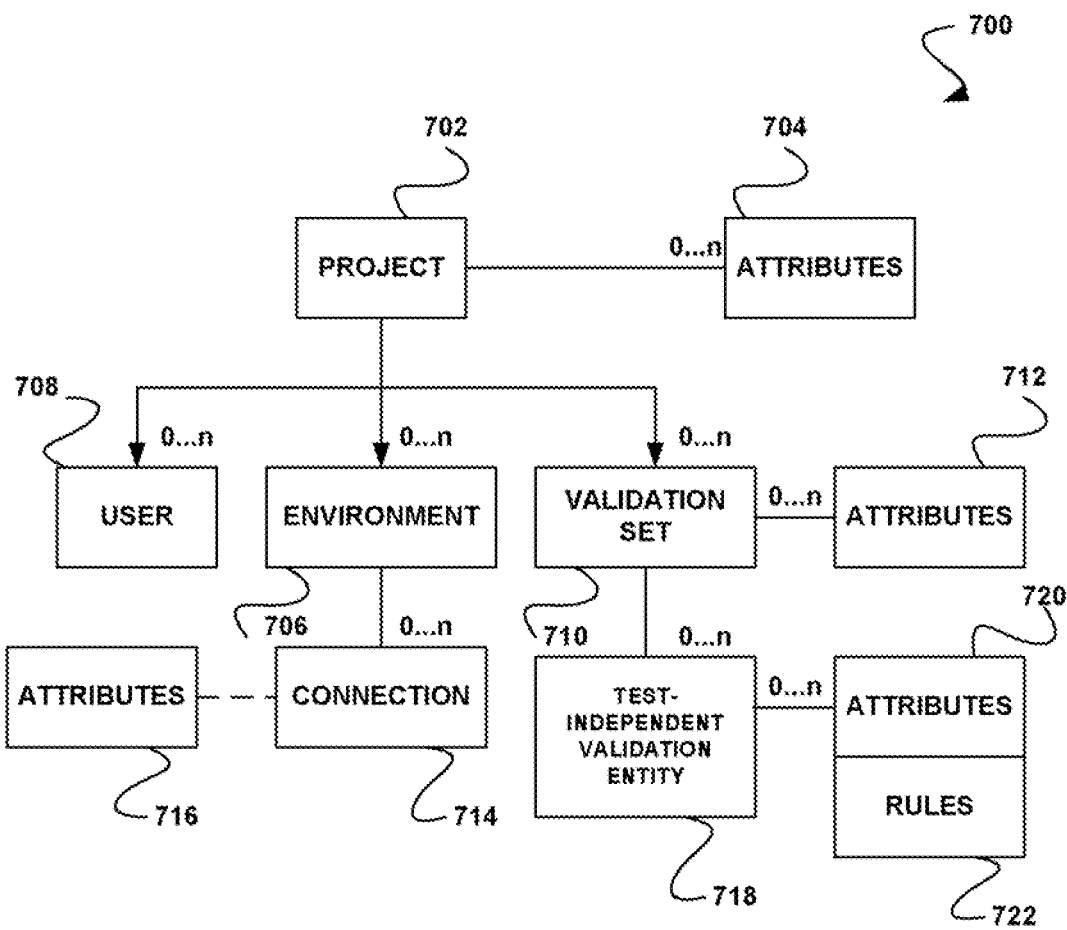
FIG. 7 shows a project utilized for validating results of a test, in accordance with another embodiment.

FIG. 7 shows a project 700 utilized for validating results of a test, in accordance with another embodiment. As an option, the project 700 may be implemented in the context of the details of FIGS. 1-6. Of course, however, the project 700 may be carried out in any desired environment. Again, the aforementioned definitions may equally apply to the description below.

As shown, a project 702 may be a container which contains test-independent validation entities for validating results of a test. In addition, the project 702 may represent computer code being tested. For example, the project 702 may contain test-independent validation entities associated with (e.g. pertinent to, etc.) a test.

The project 702 may be associated with global attributes 704 that may be utilized by any test-independent validation entities within the project 702. In addition, the project 702 may have at least one user 708 assigned thereto. The user may include the creator of the project 702 and/or any other user capable of utilizing the project. In one optional embodiment, the creator of the project 702 may automatically be a user assigned to the project 702, while other users may be assigned to the project 702 by such creator. The user 708 may be allowed to utilize the project 702 for validating results of a test, for example.

The project 702 may also contain at least one environment 706. The environment 706 may logically aggregate connections 714 within the project 702. Such connections 714 may each represent data channels and/or repository types from which test results may be received. For example, the connection 714 may include instances of databases, port identifiers, host identifiers, etc. Thus, the connections 714 may be utilized by attributes 716 for allowing attributes 716 within the project 702 to access such test results.

The project 702 may also include a validation set 710. The validation set 710 may be associated with set attributes 712 which may be utilized by test-independent validation entities 718 within such set. Further, the validation set 710 may aggregate together such set attributes 712 and test-independent validation entities 718.

The test-independent validation entities 718 may include containers that logically aggregate validation attributes 720 and validation rules 722. For example, the test-independent validation entities 718 may provide operations to be performed on results of a test, utilizing such validation attributes 720 and validation rules 722. Accordingly, a project 702 may be provided in which attributes may optionally be defined at any level of such project 702, and where validation rules 722 may be defined for each test-independent validation entity 718.

Figure 8:
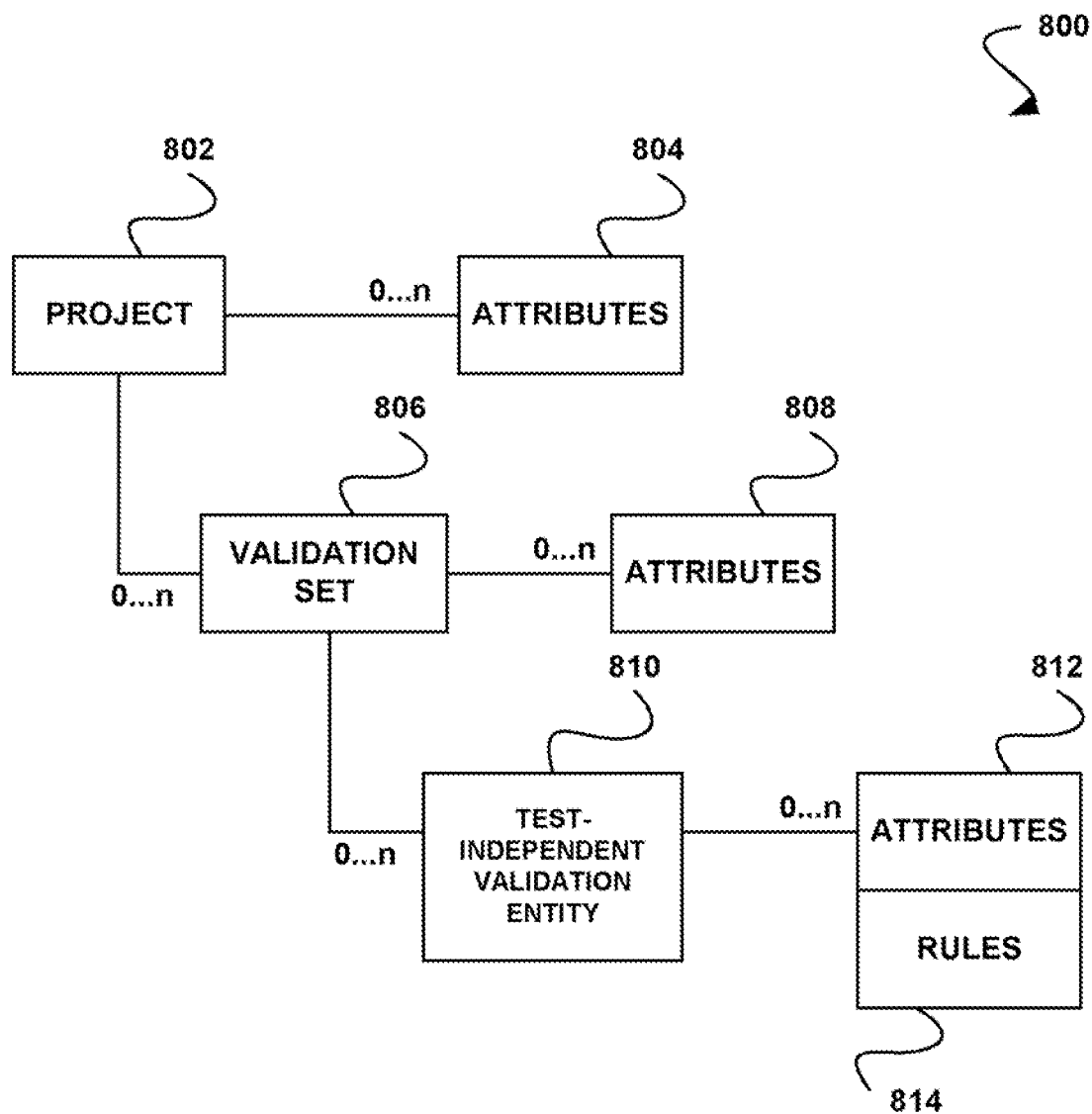
FIG. 8 shows a hierarchy model of attributes, in accordance with yet another embodiment.

FIG. 8 shows a hierarchy model 800 of attributes, in accordance with yet another embodiment. As an option, the hierarchy model 800 may be implemented in the context of the details of FIGS. 1-7. Of course, however, the hierarchy model 800 may be carried out in any desired environment. Again, the aforementioned definitions may equally apply to the description below.

As shown, the hierarchy model 800 may include project level attributes 804 (e.g. global attributes, etc.). Project level attributes 804 may be utilized by any test-independent validation entity 810 within a project 802. In this way, project level attributes 804 may be utilized by any other attributes.

The hierarchy model 800 may also include validation set level attributes 808. Such validation set level attributes 808 may be associated with validation sets 806, and may be utilized by attributes in the same set along with test-independent validation entity level attributes 812. Further, test-independent validation entity level attributes 812 may be utilized only by attributes within the same entity.

Thus, attributes may be defined for each level of a project 800 for defining a scope of such attributes. Accordingly, attributes and validation rules 814 may be utilized efficiently. Just by way of example, duplication of attributes may be prevented.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying at least one validation entity utilized and stored independently of a testing tool for testing computer code, the at least one validation entity including at least one attribute for use in storing data associated with a test result;
testing the computer code using a test and generating a result of the testing as the test result, where the testing tool includes the test of the computer code and where the testing tool supplies external data required for executing the test of the computer code;
populating the at least one attribute of the at least one validation entity with a location path for retrieving the result of the test of the computer code during the testing of the computer code; and
validating the result of the test of the computer code, where the populated at least one attribute of the at least one validation entity is utilized to retrieve the result of the test of the computer code from the testing tool;
wherein the test of the computer code is located and executed on a client computer on which the computer code is located, and the at least one validation entity is stored on a server computer in communication with the client computer;
wherein the test of the computer code is performed by the testing tool, the result of the test is sent from the testing tool to the server computer for validation using the at least one validation entity, and results of the validation are transmitted by the server computer to the testing tool.

2. The method of claim 1, wherein the at least one validation entity includes a validation rule.

3. The method of claim 2, wherein the validation rule of the validation entity applies an operator to the populated at least one attribute to perform an operation on the populated at least one attribute of the at least one validation entity.

4. The method of claim 1, wherein the populated at least one attribute is utilized by a validation rule of the at least one validation entity.

5. The method of claim 1, wherein the at least one validation entity is utilized to validate results of a plurality of different tests.

6. The method of claim 1, wherein the at least one validation entity is utilized to validate a plurality of instances of the result of the test.

7. The method of claim 1, wherein the test includes execution of the computer code utilizing the testing tool and an application under test (AUT) module.

8. The method of claim 1, wherein the result of the test includes a flow of the computer code.

9. The method of claim 1, wherein the validating the result of the test comprises comparing the result of the test to at least a portion of the at least one validation entity.

10. The method of claim 9, wherein the comparing the result of the test to the at least the portion of the validation entity includes performing an inter-source comparison.

11. The method of claim 1, wherein the result of the test is compressed.

12. The method of claim 1, wherein the result of the test is encrypted.

13. The method of claim 1, wherein the result of the test is stored in a database.

14. The method of claim 1, wherein the result of the test is stored in a file system.

15. The method of claim 1, wherein the result of the test is written in an extensible markup language.

16. The method of claim 1, wherein the at least one validation entity includes a container that aggregates the at least one attribute and one or more validation rules defined for the at least one validation entity.

17. The method of claim 16, wherein the at least one validation entity provides operations to be performed on the result of the test of the computer code, utilizing the at least one attribute and the one or more validation rules.

18. The method of claim 16, wherein the at least one attribute includes an abstract representation of the data.

19. The method of claim 1, wherein the at least one validation entity includes a plurality of validation rules, where each validation rule is associated with a single validation of a portion of the result of the test of the computer code.

20. The method of claim 1, wherein the at least one attribute includes a validation set level attribute associated with a validation set for utilization only by another attribute within the validation set.

21. The method of claim 1, wherein the at least one attribute is populated with a dynamic property during execution of the test of the computer code.

22. The method of claim 1, wherein the location path for retrieving the result of the test included in the populated at least one attribute includes at least one of an xPath, an X:Y coordinate, and a file path.

23. The method of claim 1, further comprising determining whether the at least one validation entity depends on external data, and requesting the external data and receiving the external data at the at least one validation entity when it is determined that the at least one validation entity depends on the external data.

24. A computer program product embodied on a non-transitory computer readable storage medium, comprising:
 computer code for identifying at least one validation entity utilized and stored independently of a testing tool for testing computer code, the at least one validation entity including at least one attribute for use in storing data associated with a test result;
 computer code for testing the computer code using a test and generating a result of the testing as the test result, where the testing tool includes the test of the computer code and where the testing tool supplies external data required for executing the test of the computer code;
 computer code for populating the at least one attribute of the at least one validation entity with a location path for retrieving the result of the test of the computer code during the testing of the computer code; and
 computer code for validating the result of the test of the computer code, where the populated at least one attribute of the at least one validation entity is utilized to retrieve the result of the test of the computer code from the testing tool;
 wherein the computer program product is operable such that the test of the computer code is located and executed on a client computer on which the computer code is located, and the at least one validation entity is stored on a server computer in communication with the client computer;
 wherein the computer program product is operable such that the test of the computer code is performed by the testing tool, the result of the test is sent from the testing tool to the server computer for validation using the at least one validation entity, and results of the validation are transmitted by the server computer to the testing tool.

25. A system, comprising:
 a processor for:
  identifying at least one validation entity utilized and stored independently of a testing tool for testing computer code, the at least one validation entity including at least one attribute for use in storing data associated with a test result,
  testing the computer code using a test and generating a result of the testing as the test result, where the testing tool includes the test of the computer code and where the testing tool supplies external data required for executing the test of the computer code,
  populating the at least one attribute of the at least one validation entity with a location path for retrieving the result of the test of the computer code during the testing of the computer code, and
  validating the result of the test of the computer code, where the populated at least one attribute of the at least one validation entity is utilized to retrieve the result of the test of the computer code from the testing tool;
 wherein the system is operable such that the test of the computer code is located and executed on a client computer on which the computer code is located, and the at least one validation entity is stored on a server computer in communication with the client computer;
 wherein the system is operable such that the test of the computer code is performed by the testing tool, the result of the test is sent from the testing tool to the server computer for validation using the at least one validation entity, and results of the validation are transmitted by the server computer to the testing tool.

26. The system of claim 25, further comprising a display and memory coupled to the processor via a bus.

* * * * *